US007074296B2

(12) United States Patent
Vonlanthen

(10) Patent No.: US 7,074,296 B2
(45) Date of Patent: Jul. 11, 2006

(54) IN-EAR HEARING AID AND METHOD FOR ITS MANUFACTURE

(75) Inventor: Andi Vonlanthen, Remetschwil (CH)

(73) Assignee: Phonak AG, Stafa (CH)

(*) Notice: Subject to any disclaimer, the term of this patent is extended or adjusted under 35 U.S.C. 154(b) by 0 days.

(21) Appl. No.: 10/909,828

(22) Filed: Aug. 2, 2004

(65) Prior Publication Data

US 2005/0002540 A1 Jan. 6, 2005

Related U.S. Application Data

(62) Division of application No. 09/588,366, filed on Jun. 6, 2000, now Pat. No. 6,879,696.

(51) Int. Cl.
*B32B 37/00* (2006.01)
*H04R 25/00* (2006.01)

(52) U.S. Cl. ...................... 156/293; 156/256; 156/267; 156/298; 156/257; 156/265; 156/268; 156/514; 156/517; 381/322; 381/324; 381/325; 381/328; 381/330; 381/345; 381/381; 181/158; 181/132; 181/15

(58) Field of Classification Search ............... 156/73.5, 156/257, 265, 268, 293, 298, 513, 514, 517, 156/560, 256, 267; 381/322, 324, 325, 328, 381/330, 345, 381; 181/132, 15, 158
See application file for complete search history.

(56) References Cited

U.S. PATENT DOCUMENTS 6,164,409 A * 12/2000 Berger ........................ 181/135
6,359,993 B1 * 3/2002 Brimhall ..................... 381/328

* cited by examiner

*Primary Examiner*—Linda Gray
(74) *Attorney, Agent, or Firm*—Pearne & Gordon LLP

(57) ABSTRACT

A method of manufacturing a hearing device including providing a hearing aid housing having an opening, providing an electric/acoustic transducer, providing a support plate forming a blind hole having a membrane as a base, inserting the transducer into the blind hole, bringing the housing and support plate together such that a portion of the transducer enters through the opening in the housing, bonding the housing to the support plate, and trimming excess portion of the support plate.

26 Claims, 4 Drawing Sheets

IN-EAR HEARING AID AND METHOD FOR ITS MANUFACTURE

CROSS-REFERENCE TO RELATED APPLICATION

This application is a divisional of application 09/588,366 filed Jun. 6, 2000, now U.S. Pat. No. 6,879,696 and incorporated herein by reference; and

BACKGROUND OF THE INVENTION

The present invention relates to an in-ear hearing aid comprising an electric/acoustic transducer system. The invention furthermore relates to a method for manufacturing an in-ear hearing aid.

Soiling is a problem in in-ear hearing aids, in particular as regards the acoustic device's output facing the eardrum. Such soiling degrades hearing-aid operation and requires periodic cleaning. The conventionally used aperture in the hearing aid housing used as acoustic output and coupled to the electric/acoustic transducer in this respect entails significant cleaning problems.

BRIEF SUMMARY OF THE INVENTION

The European patent document 0,548,580 discloses using a membrane at the in-ear hearing aid to seal said housing, said membrane being coupled, as in the case of the actual loudspeaker diaphragm, with the loudspeaker's motor drive. As a result the hearing aid design is comparatively more complex and so are the steps required to couple the said membrane to the loudspeaker drive and to assure that said membrane shall not be degraded by cleaning.

The objective of the present invention is elimination of the above stated drawbacks of the known solutions and to propose an in-ear hearing aid of which the design shall fully meet the cleaning requirements in simple manner.

This goal of the invention is attained in that the acoustic output of the electric/acoustic transducer system at the in-ear hearing aid is separated by a freely vibrating membrane of said hearing aid from the hearing aid's environment.

It is the insight of the invention that by appropriately designing the acoustically effective spaces in the hearing aid and by appropriately controlling the membrane characteristics, acoustic impedance matching can be achieved so that such a freely vibrating membrane practically shall not affect the acoustic transfer function of the hearing aid at the output side of said transducer, that is, the said membrane shall be acoustically transparent.

Where desired, such a membrane also may be used as a damper.

In another preferred embodiment of the in-ear hearing aid of the invention, the freely vibrating part of the membrane is made of a single material, which preferably shall be elastomeric, for instance being latex or a silicone rubber. In a preferred embodiment, moreover, the membrane of the invention shall be of constant thickness at least within said vibrating part.

The cost of making the hearing aid is only trivially increased by introducing the above membrane. The preferably used membrane material, for instance latex or silicone, is highly economical and is manufactured in low, uniform thicknesses, it is stress-resistant and unobjectionable as regards making contact with living tissue.

In an especially preferred embodiment, the said membrane is mounted very close to the hearing-aid output, and as a result indentations and accumulations at the hearing aid that would raise cleaning difficulties are eliminated at least in the vicinity of said output. Moreover the acoustic output of the transducer system can be connected by a tube stub to the acoustic output aperture, however and in preferred manner, the acoustic output of the electric/acoustic transducer system shall be mounted in the direct vicinity of the output aperture of the hearing-aid housing.

In a further embodiment which is exceedingly advantageously with respect to hearing-aid manufacture, the hearing-aid output aperture consists by a lamellar sealing element connected to the remaining hearing-aid housing, for instance by welding or bonding. And in a further preferred manner, the membrane sealing the hearing-aid output aperture shall be integral with said sealing element, or it may be separate. Where desired the membrane may be slipped like a hose over the hearing-aid housing.

If the said sealing element is integral with the membrane, then the requirements relating of materials applying to the membrane also must apply to the sealing element. Preferably the said sealing element then shall be made of a elastomeric material, for instance latex or silicone.

The manufacturing method of the invention relating to the cited in-ear hearing aid furthermore is characterized by a transducer system situated in a blind aperture in a support plate of which the base is formed by a membrane. Upon relative motion of support plate and hearing-aid housing, the transducer system then shall be inserted from the end constituting the acoustic output of the hearing-aid housing into this housing. Next the support plate is connected to the hearing-aid housing, for instance by bonding or welding, and thereafter the support plate is molded along the contour of the hearing-aid housing.

Such a procedure is extraordinarily well suited to automate the assembly of the in-ear hearing-aid housing and of the electric/acoustic transducer system as well as of the membrane.

In a preferred implementation of the manufacturing method of the invention, the membrane is integral with the support plate, this support plate preferably being made of a elastomeric material such as latex or silicone, or first the membrane in the form of a sheet and with apertures is deposited on the support plate and in this manner the blind apertures are formed first.

It has been conventional practice so far to manually carry out the assembly of in-ear hearing-aid housings and electric/acoustic transducer systems. Such a procedure eliminates the formation of acoustically shunting elements between the loudspeaker in the electric/acoustic transducer system and the hearing-aid housing whereby there would be feedback of the acoustic signals either directly or through the adjacent ear tissue into the acoustic/electric transducer at the input of the transducer system. Therefore, as already stated, the transducer system is manually inserted into the hearing-aid housing so as to be omnidirectionally spaced from it and to fix it in position therein.

In another aspect of the present invention, its objective is to substantially reduce the heretofore conventionally entailed cost of manufacture. This goal is attained basically by means a transducer system inserted in automated manner into the hearing-aid housing. Compared with conventional procedure, wherein the transducer system is slipped from "above" into the hearing-aid housing, another and much preferred implementation of said manufacturing method of the invention inserts the transducer system through an aperture constituting the acoustic output of the hearing-aid housing into this housing. In a further much preferred implementation, the method of the invention is implemented in that the transducer system is positioned in a seating aperture of a support plate and then, on account of relative motion between the support plate and the hearing-aid housing, this transducer system is inserted from the end constituting the acoustic output of the hearing-aid housing into said housing. Especially as regards this further preferred implementation, whereby thereupon the support plate is joined to the hearing-aid housing, for instance by bonding or welding, and thereafter the support plate is contoured along the outer contour of the hearing-aid, the invention achieves positioning and affixing the transducer system in said support plate, as a result of which positioning the transducer system in the hearing-aid housing is reduced to the simple task of securing accurate advancing motions of hearing-aid housing and support plate. As already mentioned, such a procedure is ideal for automated assembly.

BRIEF DESCRIPTION OF THE DRAWINGS

The invention is elucidated below in relation to the attached Figures.

DETAILED DESCRIPTION OF THE PREFERRED EMBODIMENTS

Figure 1:
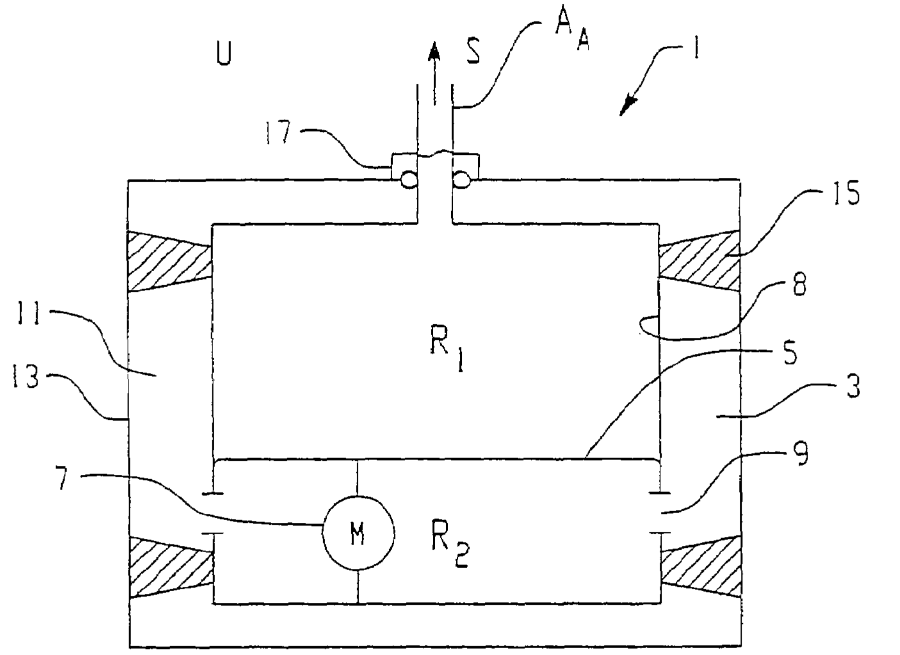
FIG. 1 diagrammatically shows a transducer system in the form of a module.

FIG. 1 diagrammatically shows a transducer module serving herein to elucidate the principles of acoustic coupling of this hearing aid. The transducer module 1 comprises a loudspeaker housing 3 wherein is supported the loudspeaker diaphragm 5. This loudspeaker diaphragm 5 is powered by a motor drive 7 merely indicated in schematic manner. The loudspeaker diaphragm 5 divides the loudspeaker housing 3 into a front chamber R1 and a rear chamber R2. One of the two cited chambers, for instance the rear chamber R2, is acoustically coupled through acoustic coupling apertures 9 with an acoustic gap 11 subtended between the loudspeaker housing 3 and the enclosure 13. The enclosure 13 and hence the gap 11 substantially entirely enclose the loudspeaker housing 3 except for elastic braces 15 by means of which the loudspeaker housing is spaced and supported in substantially “floating” manner within the enclosure 13. As shown in FIG. 1, the front chamber R1 communicates with the acoustic output AA of the transducer module 1.

In this design, on account of the substantially free-floating support of the loudspeaker housing 3 in the enclosure 13, the loudspeaker effect on the enclosure 13 is acoustically decoupled from this enclosure. By significantly enlarging the rear diaphragm chamber R2, namely by including the gap 11, the acoustic behavior of the transducer module 1 is significantly improved over that of the loudspeaker system in the housing 3: the bass of the transducer module is raised by several dB compared to the bass of the loudspeaker system in the housing 3.

In a preferred embodiment of the transducer module 1 invention, this very module shall be fitted with a membrane, as diagrammatically indicated by 17, at the acoustic output AA. Except for being clamped at its rim, the membrane 17 is vibrates freely. Preferably this membrane is made of a homogeneous material, preferably a elastomeric material such as latex or silicone rubber, and in a further preferred manner, its thickness is constant and about 100μ, preferably no more than 0.09 mm.

By matching the acoustic impedance of the gap 11 to the chamber R2, of the chamber R1 as far as the membrane 17, of the membrane 17 and any acoustic conductor that might be provided to propagate toward the environment U of the transducer module 1, the membrane 17 is practically acoustically transparent.

Figure 2:
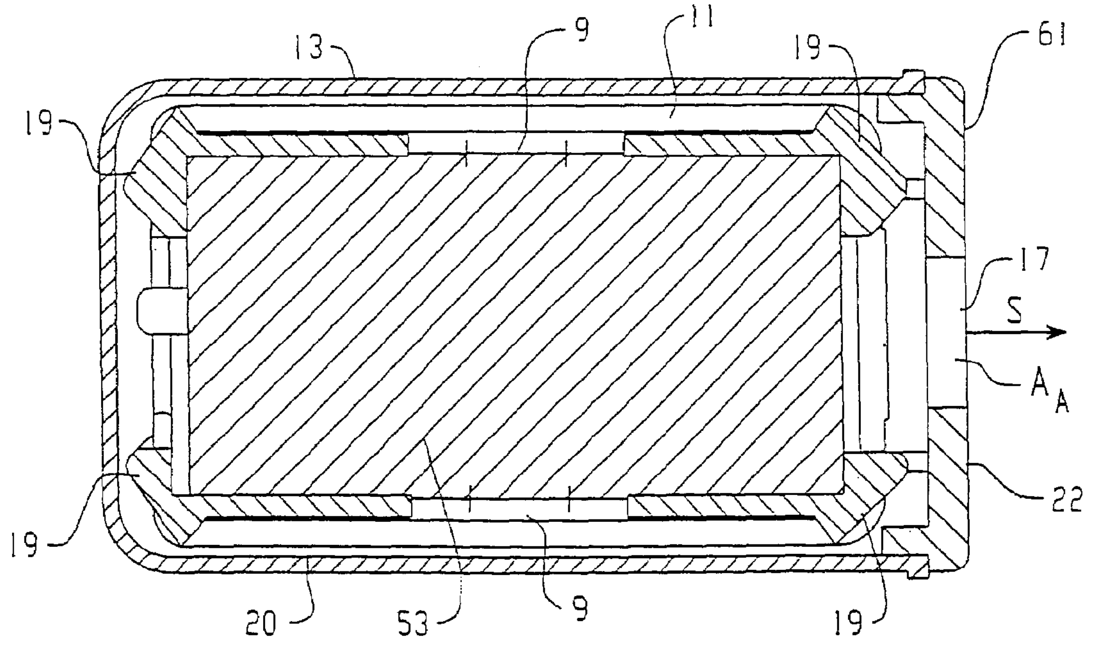
FIG. 2 is a diagrammatical simplification of a longitudinal section of one embodiment of a transducer system.

FIG. 2 is a cross-section of one embodiment of the transducer module 1. The references already used in the diagram of FIG. 1 are used herein also. The loudspeaker housing 3 comprising the coupling apertures 9 is supported by elastomeric bearings 19 on the enclosure 13. The enclosure 13 is constituted by a cup 20 preferably simultaneously acting as a magnetic shield and for that purpose preferably being made of mu-metal (μ-metal). In any event the cup 20 preferably shall be metallic. The cup 20 is sealed by a cover 22. The membrane 17 already shown in FIG. 1 may be mounted directly on the cover 22. Furthermore the cover 22 and the membrane 17 may very well be integral, in which case however the material of the cover 22 must meet the material requirements of the membrane, for instance regarding elastomeric behavior. Illustratively the entire component 22 shall be made of latex or silicone rubber. Otherwise the membrane 17 is anchored as a separate element on the cover 22. However the membrane 17 also may be fitted between the acoustic output AA in the loudspeaker housing 3 and the aperture in the cover 22. Preferably however, as shown in FIG. 2, the membrane 17 is trimmed to be flush with the aperture in the cover 22, whereby the transducer module 1 as a whole shall be a unit which is sealed and encapsulated per se and which can be cleaned very easily. Such a feature is especially significant if, as shall be discussed further below, the output AA of the transducer module 1 is situated directly at the acoustic output of a hearing aid.

Figure 2A:
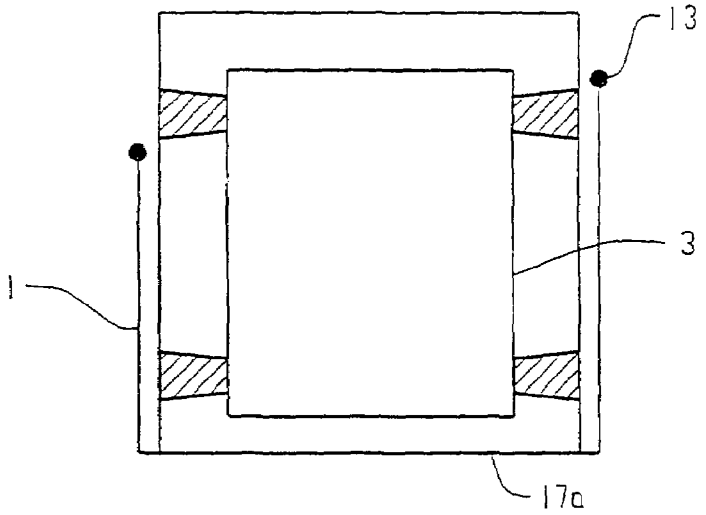
FIG. 2*a* is another diagrammatical embodiment of the transducer of FIG. 2 fitted with a membrane of the invention, FIG. 3 diagrammatically shows the installation of a transducer system into an in-ear hearing aid of the invention fitted with a membrane of the invention.

The transducer module, or its enclosure 13, can be cubic, cylindrical or assume another, arbitrary shape, provided that the required gap 11 substantially enclosing the loudspeaker housing 3 shall be subtended by the loudspeaker housing 3 and the enclosure 13. Based on the discussion relating to FIG. 2, FIG. 2*a* shows another embodiment, in merely diagrammatic form. Therein an elastomeric sleeve 17*a* is pulled over the enclosure 13. Said sleeve 17*a* simultaneously constitutes the cover 22 and the membrane 17.

Figure 3:
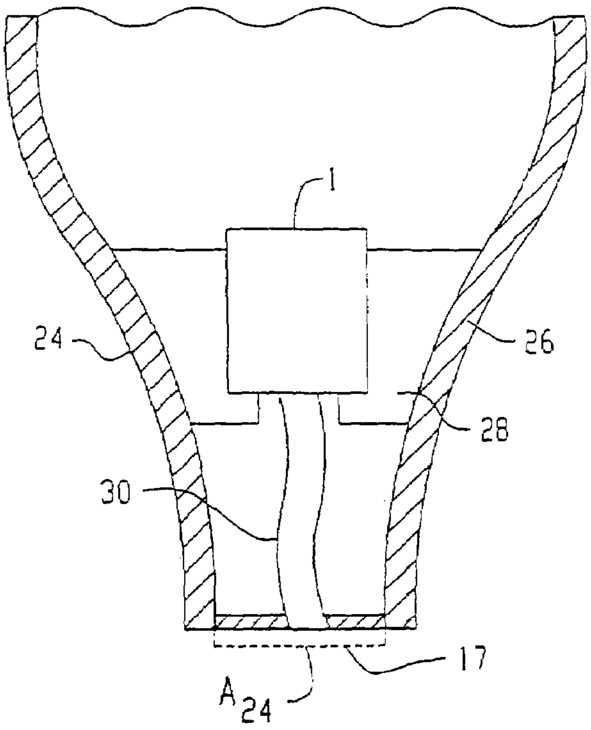

FIG. 3 diagrammatically shows the segment comprising the output aperture $A_{24}$ of an in-ear hearing aid 24. The transducer module 1 of FIGS. 1, 2 or 2*a* is integrated into the hearing-aid housing 26, namely being situated and kept in position in frictionally or geometrically locking manner by means of straps 28, in the hearing-aid’s housing 26. This feature is made possible by decoupling the enclosure 13 from the loudspeaker housing 3 in the transducer module in the manner discussed in relation to FIGS. 1, 2 and 2*a*. Otherwise the design of the in-ear hearing aid of FIG. 3 is substantially the same as the known designs because the acoustic output of the transducer module 1 is connected by a tubular stub 300 to the acoustic output aperture A24 of the hearing aid.

The electronic components and the input-side acoustic/electrical transducer system at the in-ear hearing aid 24 comprising the housing 26 are omitted from FIG. 3 and the further Figures because not being essential to the invention.

As further shown in FIG. 3, the membrane 17 used in the preferred embodiments is integrated in the immediate vicinity of the acoustic output $A_{24}$ in the hearing-aid housing 26.

Figure 4:
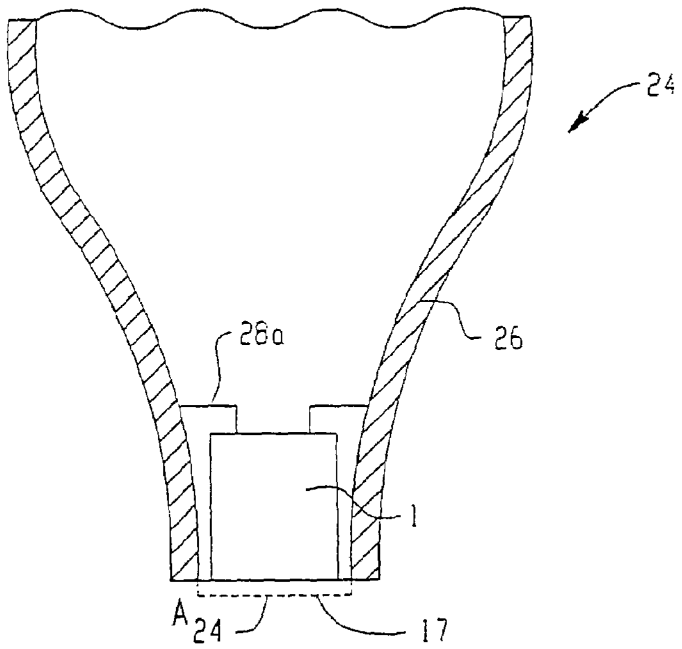
FIG. 4 is a view similar to FIG. 3 of a further possible integration of a transducer system fitted with the membrane of the invention into an in-ear hearing of the invention.

In FIG. 4, the transducer module 1 is mounted in frictionally or geometrically locking manner in the immediate vicinity of the acoustic output $A_{24}$ of the hearing aid 24, i.e. of the housing 26 as indicated by the diagrammatically shown supports 28*a*. In a preferred embodiment mode, the freely vibrating membrane 17 is mounted terminally.

Figure 5:
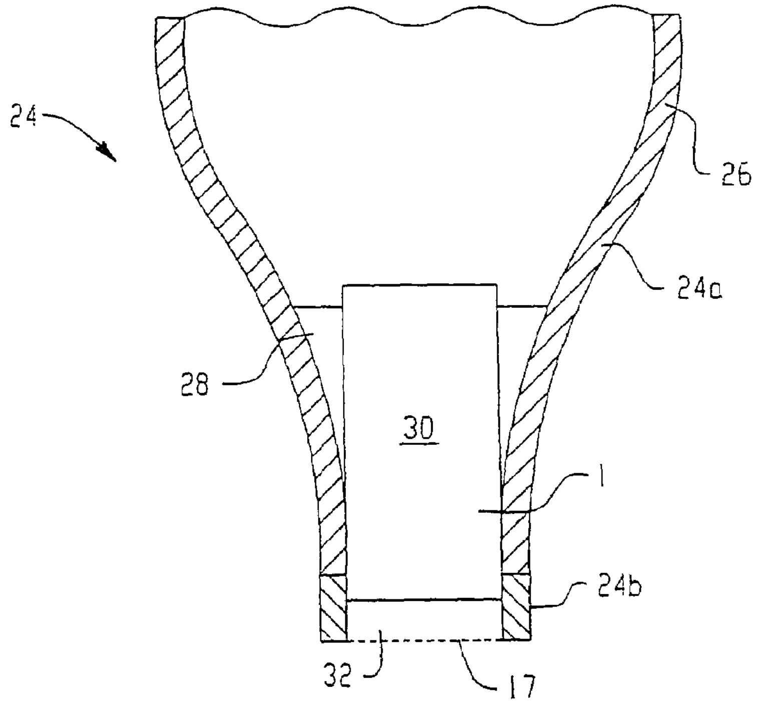
FIG. 5 is a view similar to FIG. 3 or FIG. 4 of a further preferred embodiment variation of that portion of an in-ear hearing aid which constitutes the acoustic output of the hearing aid, and FIGS. 6*a*–6*c* diagrammatically show the sequence of a manufacturing method of the invention applied to an in-ear hearing aid as regards assembling the electric/acoustic transducer system and the hearing-aid housing.

As shown in FIG. 5, the housing 26 of the in-ear hearing aid 24 consists of a main housing part 24*a*, whereas a laminar cover 24*b* is set terminally on the component 24*a* onto which it is bonded or welded. A transducer module 1 described in relation to FIGS. 1 and 2—or one fitted directly to the loudspeaker housing of a loudspeaker system of the prior state of the art, which in FIG. 5 includes both and is denoted by 30—is seated in the output aperture 32 of the cover 24*b* where it is affixed by clamping, bonding etc. If the transducer module 30 shown in generalized form in FIG. 5 is fitted with an enclosure, that is designed in the manner of FIGS. 1 and 2 or 2*a*, then the hearing-aid housing 26 may again contain positioning and affixation elements again denoted by 28 for said transducer module 1.

A preferred membrane of the above described kind is denoted by 17 also in FIG. 5 in a preferred position. As discussed further below, the design of FIG. 5, whether applied to hearing aids comprising a transducer module as shown in FIGS. 1, 2, 2*a* or whether applied to previously known transducer systems, that is with a loudspeaker housing directly on the outside, does offer substantial advantages. Moreover the membrane 17 may be integral with the component 24*b*, and in particular the material selection regarding the portion 24*b*, which is separate from the remaining housing 26, can be matched to the requirements placed on the membrane 17.

Figure 6A:
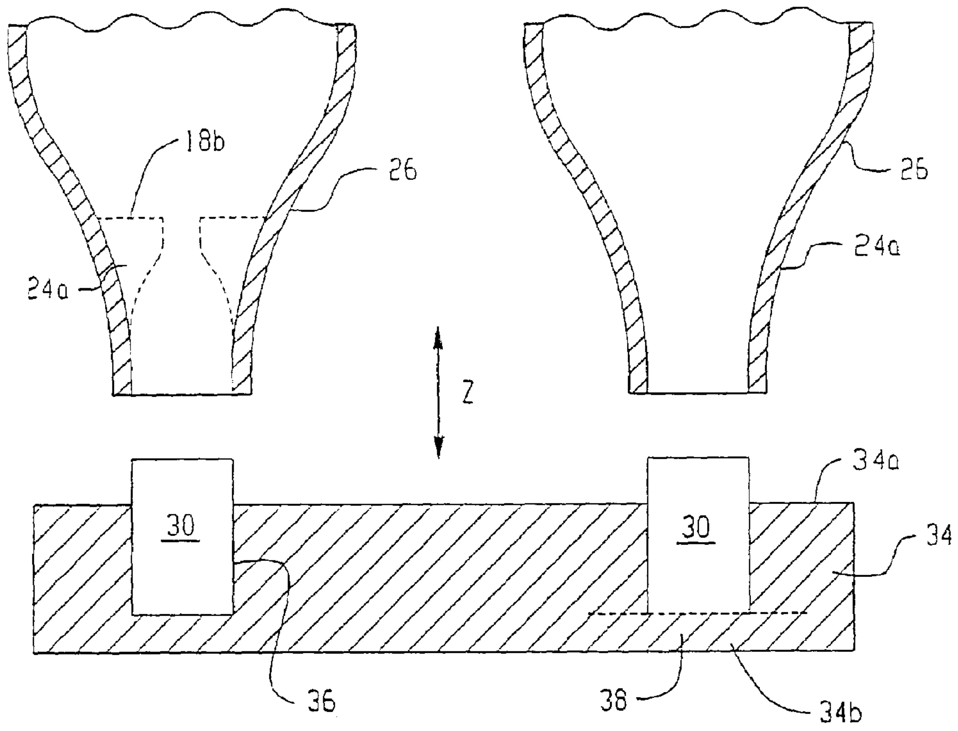
Figure 6B:
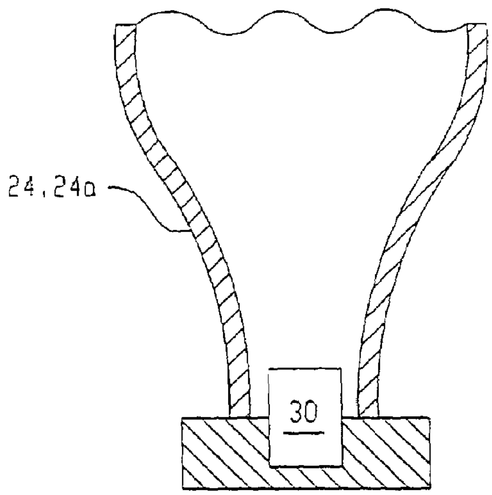
Figure 6C:
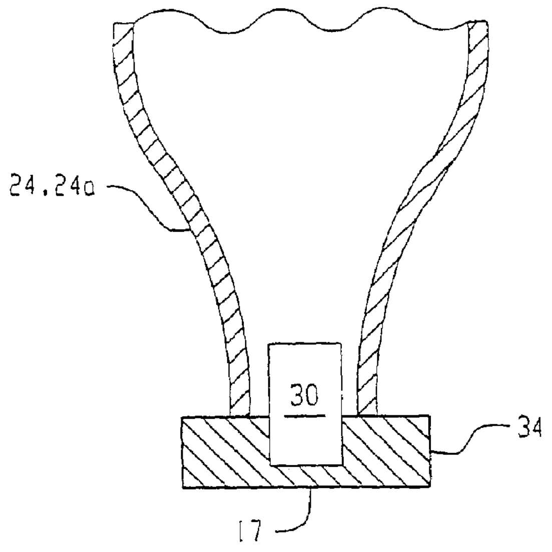
Figure 1:
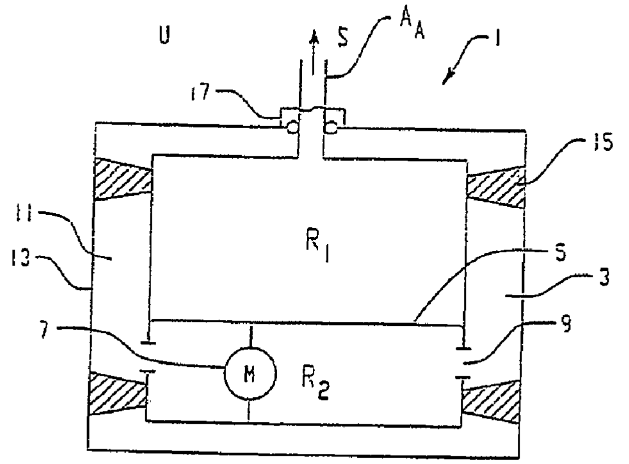
Figure 2:
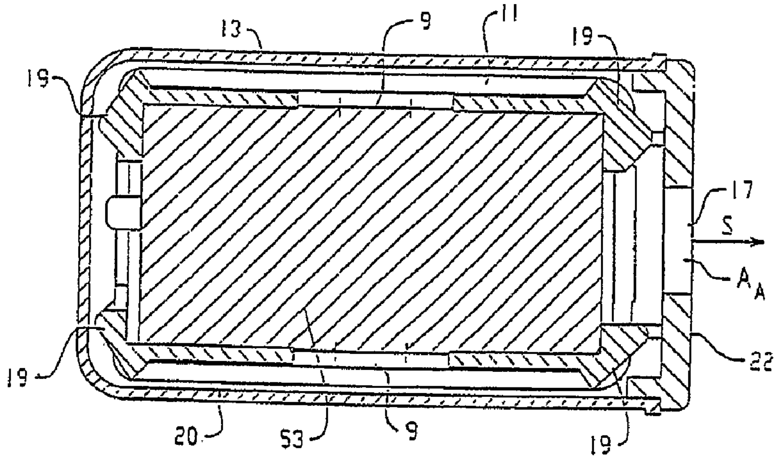
Figure 2A:
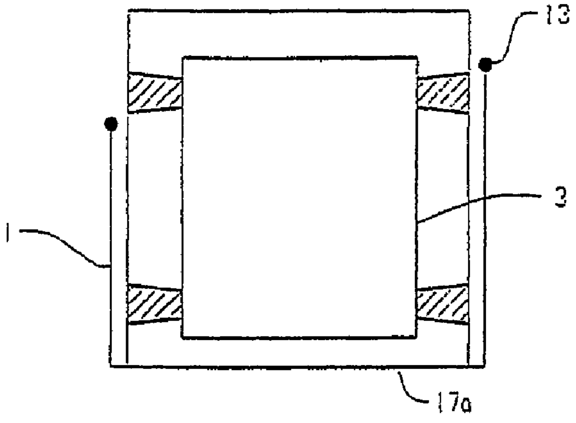
Figure 3:
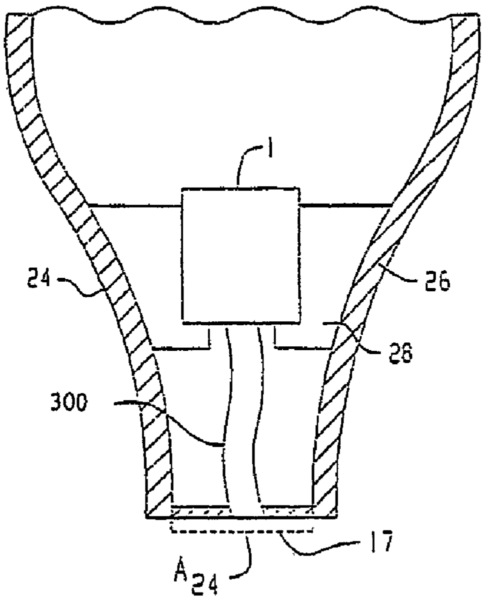
Figure 4:
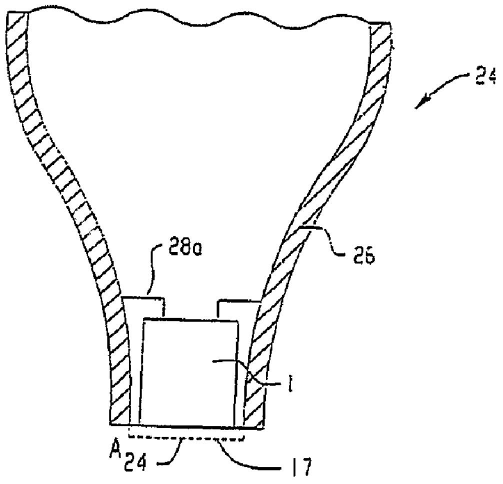
Figure 5:
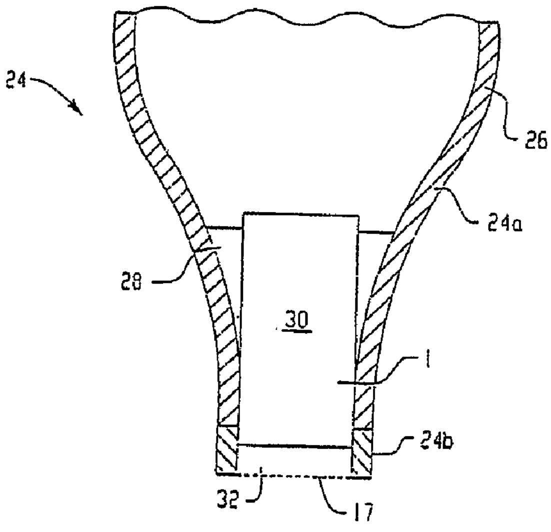
Figure 6A:
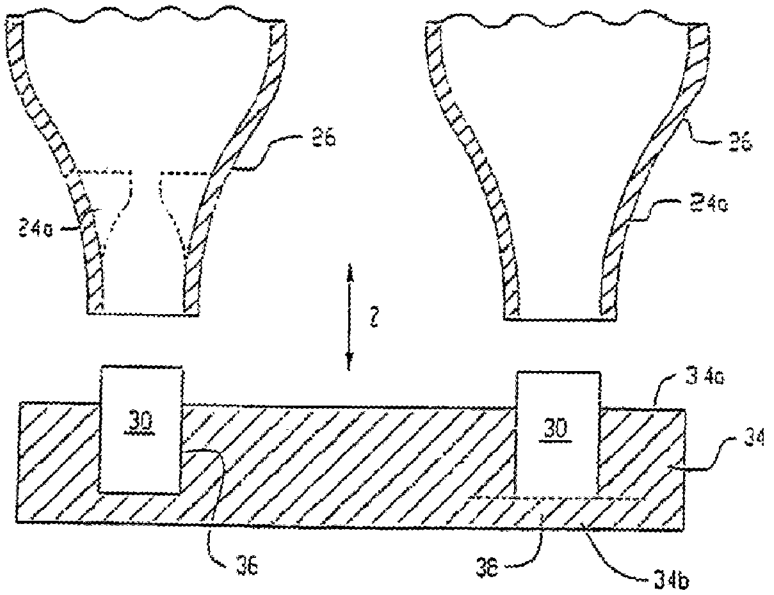
Figure 6B:
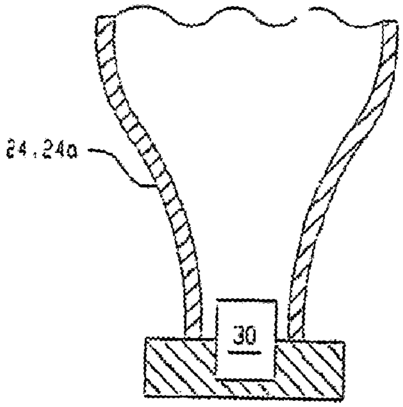
Figure 6C:
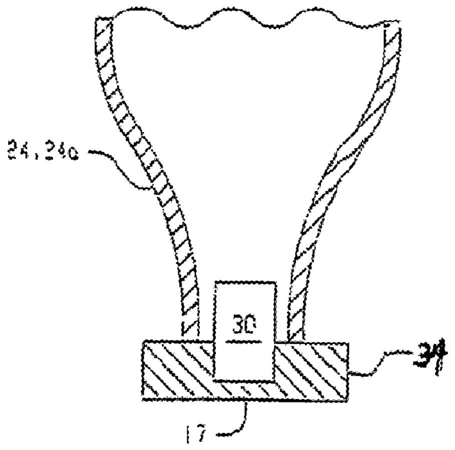

FIGS. 6*a* through 6*c* schematically show the sequence of a manufacturing method of in-ear hearing aids.

As shown in FIG. 6*a*, preferably blind apertures 36 are present in a support plate 34 and receive the transducer systems 30 of the in-ear hearing aids. If these transducer systems 30 are conventional, that is, if comprising an external loudspeaker housing and lacking an enclosure as shown in FIGS. 1, 2, 2*a*, then the transducer systems 30 preferably shall be firmly anchored in the support plate 34, for instance by bonding. If on the other hand the transducer systems do comprise external enclosures as shown in FIGS. 1, 2, 2*a*, then the systems 30 need not be kept firmly joined to the support plate 34, because, as already discussed and as shown at 28*b* in dashed lines, they may be affixed in frictionally or geometrically locking manner in the corresponding hearing-aid housings 24*a*. It is of foremost significance as regards the procedure that on account of relative motion of the plate 34 bearing the transducer systems 30 and a corresponding number of housing parts 24*a*, the transducer systems 30 shall not be inserted in the conventional manner from above, but instead from below into those segments of the housing parts 24*a* which face the acoustic output.

In case the transducer systems 30 are designed with enclosures, then, after the transducer systems 30 have been inserted in affixed manner into the housings 26, the support plate 34 may be removed, the transducer systems or modules being positioned and held in place in the housings 24*a*. On the other hand if transducer systems lacking an enclosure are involved, the transducers 30 remain in the assigned apertures 36 of the plate 34. The plate 34 is connected to the housing 24*a* for instance by bonding or welding, and, based on the position of FIG. 6*b*, the plate 34 then is trimmed to become flush with the external housing contour (transition to FIG. 6*c*).

The result is the in-ear hearing aid shown in FIG. 5. However this procedure is preferred for transducer modules designed in the manner of FIGS. 1, 2, 2*a*, that is fitted with an enclosure.

Observation of FIG. 6 shows that this procedure is unusually well suited to integrate the membrane 17 or another preferred one to act both as soil protection for the acoustic hearing-aid output and as a means assuring simple cleaning. For that purpose the base plate 38 of FIG. 6*a* of the apertures 36, which preferably shall be blind holes, shall be directly formed as the membrane. Implementation takes place either by selecting the material of the support plate 34 to match the requirements set on the membrane material and hence designing integrally with the plate 34, or, as shown in dashed lines in FIG. 6*a*, by forming the blind holes 36 first by laminating the support plate 34, the apertures still being open end to end, with a sheet 34*b* or the like which then constitutes the membrane 17 of FIG. 5.

The above discussed manufacturing method allows assembling both transducer modules as shown in FIGS. 1, 2, 2*a* and also conventional transducer systems, that is comprising an external loudspeaker housing, in the in-ear hearing aid housing, without need for laborious positioning maneuvers. Said assembly can be implemented from that side where the acoustic output is situated. As a result substantially automated assembly is made possible. If, as preferred, the acoustic hearing-aid output shall be protected against soiling from the environment, and allow good cleaning, it is also simultaneously feasible to integrate a covering membrane 17 as discussed above.

The invention claimed is:

1. A method of manufacturing a hearing device, comprising the steps of:
- providing a hearing aid housing having an opening;
- providing an electric/acoustic transducer;
- providing a support plate forming a blind hole having a membrane as a base;
- inserting said transducer into said blind hole;
- bringing said housing and said support plate together such that a portion of said transducer enters through said opening of said housing;
- bonding said housing to said support plate; and
- trimming an excess portion of said support plate.

2. The method of claim 1, wherein said membrane is integral with said support plate and formed from the same material as said support plate.

3. The method of claim 2, wherein said material includes elastomeric material.

4. The method of claim 1, wherein said membrane is formed by depositing an elastomeric sheet over a hole through said base plate, and bonding said sheet to said base plate, thereby forming said blind hole.

5. The method of claim 1, wherein said trimmed base plate forms an acoustic opening utilized as an acoustic output of said hearing device.

6. The method of claim 1, wherein said trimming step includes trimming said base plate to continue a contour of said housing.

7. A method of manufacturing a hearing device, comprising the steps of:

providing a housing having an opening;

providing an electric/acoustic transducer;

providing a support plate forming a blind hole having a membrane as a base;

inserting said transducer into said blind hole, wherein an extending portion of said transducer extends from said blind hole out of said base plate;

bringing said housing and said support plate together such that said extending portion enters through said opening of said housing;

bonding said housing to said support plate; and trimming an excess portion of said support plate.

8. The method of claim 7, wherein said membrane is integral with said support plate and formed from the same material as said support plate.

9. The method of claim 8, wherein said support plate includes elastomeric material.

10. The method of claim 7, wherein said membrane is formed by depositing an elastomeric sheet over a hole through said base plate, and bonding said sheet to said base plate, thereby forming said blind hole.

11. The method of claim 7, wherein said trimmed base plate forms an acoustic opening to be utilized as an acoustic output of said hearing device.

12. The method of claim 7, wherein said trimming step includes trimming said base plate to continue a contour of said housing.

13. A method of manufacturing a hearing device, comprising the steps of:

providing a housing having an opening;

providing an electric/acoustic transducer;

providing a support plate forming a blind hole having a membrane as a base;

inserting said transducer into said blind hole, wherein an extending portion of said transducer extends from said blind hole out of said base plate;

bringing said housing and said support plate together such that said extending portion enters through said opening of said housing;

bonding said housing to said support plate; and trimming an excess portion of said support plate to continue a contour of said housing and to form an acoustic opening to be utilized as an acoustic output of said hearing device, wherein said membrane forms a freely vibrating membrane covering said acoustic opening.

14. The method of claim 13, wherein said membrane is integral with said support plate and formed from the same material as said support plate.

15. The method of claim 14, wherein said support plate includes elastomeric material.

16. The method of claim 13, wherein said membrane is formed by depositing an elastomeric sheet over a hole through said base plate, and bonding said sheet to said base plate, thereby forming said blind hole.

17. A method of manufacturing a hearing device, said hearing device comprising:

a housing including a part forming an acoustic opening;

an electric/acoustic transducer including:

a diaphragm;

an electric drive coupled to said diaphragm; and an encapsulation comprising said part of said hearing aid housing; and a freely vibrating membrane at least substantially flush with an outer surface of said part and facing a surrounding of said hearing aid, wherein said acoustic opening establishes acoustical communication between said diaphragm and the surrounding of said hearing aid, and further wherein said acoustic opening is covered by said freely vibrating membrane; wherein said method comprises the steps of:

providing a support plate forming a blind hole having said membrane as a base;

inserting said transducer into said blind hole, wherein an extending portion of said transducer extends from said blind hole out of said base plate;

bringing said housing and said support plate together such that said extending portion enters said housing;

bonding said housing to said support plate; and trimming an excess portion of said support plate to form said part.

18. The method of claim 17, wherein said membrane is integral with said support plate and formed from the same material as said support plate.

19. The method of claim 18, wherein said support plate includes elastomeric material.

20. The method of claim 17, wherein said membrane is formed by depositing an elastomeric sheet over a hole through said base plate, and bonding said sheet to said base plate, thereby forming said blind hole.

21. A method of manufacturing a hearing device, comprising the steps of:

providing a hearing aid housing having an opening;

providing an electric/acoustic transducer;

providing a support plate forming a blind hole having a membrane as a base;

inserting said transducer into said blind hole, wherein said transducer is held within said blind hole by frictional means;

bringing said housing and said support plate together such that a portion of said transducer enters through said opening of said housing, wherein said transducer is held within said housing by frictional means;

bonding said housing to said support plate; and trimming an excess portion of said support plate.

22. The method of claim 21, wherein said membrane is integral with said support plate and formed from the same material as said support plate.

23. The method of claim 22, wherein said support plate includes elastomeric material.

24. The method of claim 21, wherein said membrane is formed by depositing an elastomeric sheet over a hole through said base plate, and bonding said sheet to said base plate, thereby forming said blind hole.

25. The method of claim 21, wherein said trimmed base plate forms an acoustic opening to be utilized as an acoustic output of said hearing device.

26. The method of claim 21, wherein said trimming step includes trimming said base plate to continue a contour of said housing.

* * * * *

UNITED STATES PATENT AND TRADEMARK OFFICE

CERTIFICATE OF CORRECTION

PATENT NO. : 7,074,296 B2
APPLICATION NO. : 10/909828
DATED : July 11, 2006
INVENTOR(S) : Vonlanthen It is certified that error appears in the above-identified patent and that said Letters Patent is hereby corrected as shown below:

The title page showing the illustrative figure should be deleted and substitute with the attached title page.

The drawing sheet, consisting of Fig. 1-3 and 6a, should be deleted and replaced with drawing sheet, consisting of Fig. 1-3 and 6a, as shown on the attached page.

<u>IN THE DRAWINGS</u>:

Fig. 1, please delete the reference numeral "8"

Fig. 2, please delete the reference numeral "61"

Fig. 3, please delete the reference numeral "30" and insert --300--

Fig. 6a, please delete the reference numeral "18b"

Signed and Sealed this

Eighteenth Day of September, 2007

JON W. DUDAS
*Director of the United States Patent and Trademark Office*

(12) United States Patent
Vonlanthen

(10) Patent No.: US 7,074,296 B2
(45) Date of Patent: Jul. 11, 2006

(54) IN-EAR HEARING AID AND METHOD FOR ITS MANUFACTURE

(75) Inventor: Andi Vonlanthen, Remetschwil (CH)

(73) Assignee: Phonak AG, Stafa (CH)

(*) Notice: Subject to any disclaimer, the term of this patent is extended or adjusted under 35 U.S.C. 154(b) by 0 days.

(21) Appl. No.: 10/909,828

(22) Filed: Aug. 2, 2004

(65) Prior Publication Data

US 2005/0002540 A1 Jan. 6, 2005

Related U.S. Application Data

(62) Division of application No. 09/588,366, filed on Jun. 6, 2000, now Pat. No. 6,879,696.

(51) Int. Cl.
*B32B 37/00* (2006.01)
*H04R 25/00* (2006.01)

(52) U.S. Cl. .................... 156/293; 156/256; 156/267; 156/298; 156/257; 156/265; 156/268; 156/514; 156/517; 381/322; 381/324; 381/325; 381/328; 381/330; 381/345; 381/381; 181/158; 181/132; 181/15

(58) Field of Classification Search .............. 156/73.5, 156/257, 263, 268, 293, 298, 513, 514, 517, 156/560, 256, 267; 381/322, 324, 325, 328, 381/330, 345, 381; 181/132, 15, 158
See application file for complete search history.

(56) References Cited

U.S. PATENT DOCUMENTS 6,164,409 A * 12/2000 Berger .................... 181/135
6,359,993 B1 * 3/2002 Brimhall .................. 381/328

* cited by examiner

*Primary Examiner*—Linda Gray
(74) *Attorney, Agent, or Firm*—Pearne & Gordon LLP

(57) ABSTRACT

A method of manufacturing a hearing device including providing a hearing aid housing having an opening, providing an electric/acoustic transducer, providing a support plate forming a blind hole having a membrane as a base, inserting the transducer into the blind hole, bringing the housing and support plate together such that a portion of the transducer enters through the opening in the housing, bonding the housing to the support plate, and trimming excess portion of the support plate.

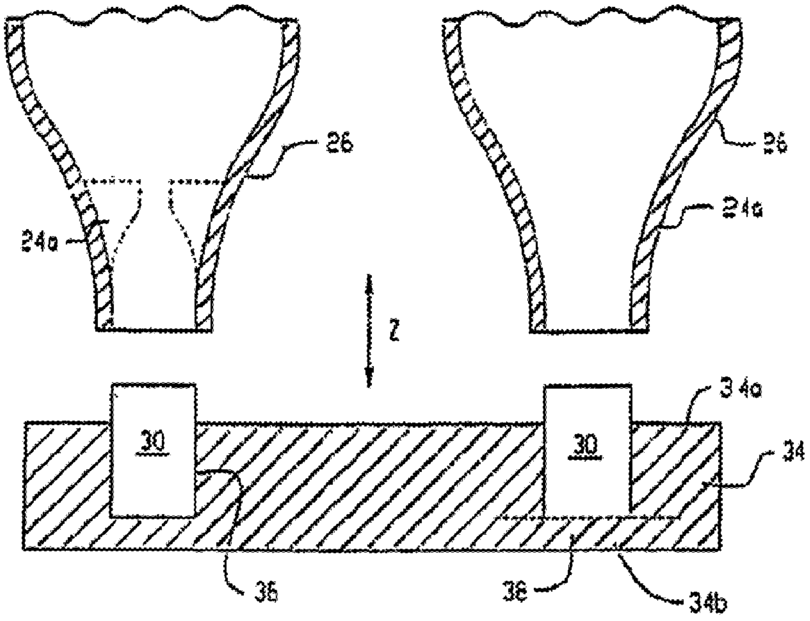

26 Claims, 4 Drawing Sheets